US008483292B2

(12) United States Patent
Wang et al.

(10) Patent No.: US 8,483,292 B2
(45) Date of Patent: Jul. 9, 2013

(54) COMMUNICATION APPARATUS, BASE STATION AND COORDINATED MULTIPOINT COMMUNICATION METHOD

(75) Inventors: Jian Wang, Beijing (CN); Jie Zhang, Beijing (CN); Jun Tian, Beijing (CN); Hua Zhou, Beijing (CN); Jianming Wu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/284,593

(22) Filed: Oct. 28, 2011

(65) Prior Publication Data

US 2012/0044978 A1    Feb. 23, 2012

Related U.S. Application Data

(63) Continuation of application No. PCT/CN2010/071728, filed on Apr. 13, 2010.

(30) Foreign Application Priority Data

Apr. 30, 2009  (CN) .......................... 2009 1 0136983

(51) Int. Cl.
*H04L 27/00*  (2006.01)
(52) U.S. Cl.
USPC ......................................... 375/259; 375/219
(58) Field of Classification Search
USPC 375/259, 260; 455/446, 452.1, 522; 370/335, 370/254, 332, 334, 203, 208, 329
See application file for complete search history.

(56) References Cited

U.S. PATENT DOCUMENTS

| | | | | |
|---|---|---|---|---|
| 6,128,276 A | * | 10/2000 | Agee | 370/208 |
| 8,155,088 B2 | * | 4/2012 | Maaref et al. | 370/335 |
| 2008/0132262 A1 | | 6/2008 | Jung et al. | |
| 2008/0310324 A1 | * | 12/2008 | Chaponniere | 370/254 |
| 2009/0028112 A1 | * | 1/2009 | Attar et al. | 370/332 |

(Continued)

FOREIGN PATENT DOCUMENTS

| CN | 101373998 | 2/2009 |
|---|---|---|
| CN | 101394378 | 3/2009 |

(Continued)

OTHER PUBLICATIONS

International Search Report issued for corresponding international patent application No. PCT/CN2010/071728, mailed Jul. 22, 2010. English translation attached.

(Continued)

*Primary Examiner* — Daniel Washburn
*Assistant Examiner* — Fitwi Hailegiorgis
(74) *Attorney, Agent, or Firm* — Myers Wolin, LLC

(57) ABSTRACT

The communication apparatus includes: a channel estimating unit for acquiring a channel estimation value of a channel between the communication apparatus and a cell base station of a cell in which the communication apparatus is located; a transmitter transmitting the channel estimation value or information based on the channel estimation value to the cell base station; a receiver receiving coordinated multipoint (CoMP) message from the cell base station, the CoMP message indicates the CoMP transmission mode, the codebook or precoding matrix used by the cell base station, and the codebook or precoding matrix used by a coordinated base station that coordinates with the cell base station; a channel matrix forming unit for acquiring a channel matrix according to the CoMP message; and a decoder decoding received signals according to the channel matrix and the CoMP message.

7 Claims, 10 Drawing Sheets

U.S. PATENT DOCUMENTS

| | | | |
|---|---|---|---|
| 2009/0034480 A1* | 2/2009 | Levin et al. | 370/334 |
| 2009/0042596 A1* | 2/2009 | Yavuz et al. | 455/522 |
| 2009/0046569 A1* | 2/2009 | Chen et al. | 370/203 |
| 2009/0213945 A1* | 8/2009 | Cairns et al. | 375/260 |
| 2010/0099428 A1* | 4/2010 | Bhushan et al. | 455/452.1 |
| 2010/0124291 A1* | 5/2010 | Muharemovic et al. | 375/260 |
| 2010/0272032 A1* | 10/2010 | Sayana et al. | 370/329 |
| 2010/0273492 A1* | 10/2010 | Liu et al. | 455/446 |

FOREIGN PATENT DOCUMENTS

| | | |
|---|---|---|
| CN | 101399583 | 4/2009 |
| EP | 2 182 663 | 5/2010 |
| WO | 2009/024018 | 2/2009 |

OTHER PUBLICATIONS

First Office Action issued for corresponding Chinese Patent Application No. 200910136983.0, dated Aug. 28, 2012, with partial English translation.

Notice of Preliminary Rejection issued for corresponding Korean Patent Application No. 10-2011-7024710, mailed Dec. 27, 2012, with English translation.

* cited by examiner

COMMUNICATION APPARATUS, BASE STATION AND COORDINATED MULTIPOINT COMMUNICATION METHOD

CROSS REFERENCE TO RELATED APPLICATIONS

This is a continuation of Application PCT/CN2010/071728, filed on Apr. 13, 2010, now pending, which claims priority to Chinese Patent Application No. 200910136983.0, filed on Apr. 30, 2009, the contents of which are herein wholly incorporated by reference.

FIELD OF THE INVENTION

The present invention relates to a wireless communication technology, and particularly, to a method and an apparatus for coordinated multi-base station or multi-cell communication in a wireless communication system.

DESCRIPTION OF THE RELATED ART

To the present, the wireless communication system has been sufficiently developed. The former second generation Global System for Mobile Communication (GSM) is in a continuous development to technologies such as General Packet Radio Service (GPRS) and Enhanced Data Rate for GSM Evolution (EDGE). The third generation GSM with a higher transmission rate, such as WCDMA and CDMA2000, is applied successively in many countries and regions throughout the world and put into commercial use. In addition to the development of the cellular communication technology, other wireless access technologies Such as Wireless Local Area Network (WLAN) and Worldwide Interoperability for Microwave Access (WiMAX) are also developed rapidly. Furthermore, projects such as the IEEE 802.16m technology facing the fourth generation GSM, the Third Generation Partnership Project Long Term Evolution (3GPP LTE), and the Third Generation Partnership Project Long Term Evolution Advanced (3GPP LTE+) also have been started to enter the stage of research and development.

With the rapid increase of people's demand for services of high speed multi-media communication and high speed wireless Internet the access, while wireless spectrum resources are limited, the problem of sufficiently improving the transmission rate and the spectrum utilization ratio of the communication system using existing band resources is urgently to be solved. As the multi-antenna technology can improve the transmission capacity or the signal quality, the above systems all use the multi-antenna technology. In the 3GPP LTE-Advanced system and IEEE 802.16m, even an antenna mode of eight transmitting antennas and eight receiving antennas from the base station to the mobile station is defined.

The spatial-time processing technology of the multi-antenna system mainly includes spatial multiplexing, spatial diversity, etc. The spatial diversity is to divide data into multiple data substreams through spatial-time coding and transmit them via multiple antennas simultaneously, so as to obtain diversity gain by introducing coding redundancy into the time domain between the transmitting antennas. The spatial multiplexing is to transmit independent information streams via the transmitting antennas, and the receiving end decodes in an interfering suppression method, so as to realize a maximum rate. Generally, the spatial multiplexing technology may be adopted to improve the throughput of the wireless communication system, while the spatial diversity technology may be adopted to expand the coverage of the wireless communication system.

In the wireless communication system, the users at the edge of a cell not only receive weak signals from the service base station due to a large distance thereto, but also are largely interfered by the signals from base stations of adjacent cells, thus the throughputs of users at the edge of the cell are deteriorated. The literatures cited for the present invention are listed as follows. These literatures are incorporated herein by reference, as if they were completely described herein.

1. [Patent Literature 1]: COX TIMOTHY [US]; KHOSH-NEVIS AHMAD [US], COOPERATIVE MULTIPLE ACCESS IN WIRELESS NETWORKS (WO2008157147);

2. [Patent Literature 2]: SHEN MANYUAN [US]; XING GUANBIN [US], Cooperative MIMO in Multicell wireless networks (US2008260064);

3. [Patent Literature 3]: LI ANXIN [CN]; LI XIANG-MING [CN], UPLINK MULTIPLE-INPUT-MULTIPLE-OUTPUT (MIMO) AND COOPERATIVE MIMO TRANSMISSIONS (WO2008124535);

4. [Patent Literature 4]: MEHTA NEELESH B [US]; ZHANG HONGYUAN [US], System and method for transmitting signals in cooperative base station multi-user MIMO networks (US2007248172);

5. [Patent Literature 5]: KIM SUNG JIN [KR]; KIM HO JIN [KR], METHOD FOR COOPERATIVE DIVERSITY IN MIMO WIRELESS NETWORK (KR20060111238);

6. [Patent Literature 6]: KIM SUNG-JIN [KR]; KIM HO-JI [KR], Method of providing cooperative diversity in a MIMO wireless network (US2006239222);

7. [Non-patent Literature 1]: Ayman F. Naguid, Vahid Tarokh, Nambirajan Seshadri, A. Robert Calderbank, "A Space-Time Coding Modem for High-Data-Rate Wireless Communications," IN IEEE JSAC, vol. 16, no. 8, October 1998, pp. 1459-1478;

8. [Non-patent Literature 2]: V. Tarokh, N. Seshadri, A. R. Calderbank, "Space-time codes for high data rate wireless communication: performance criterion and code construction", IEEE Trans. Inform. Theory, 44:744-765, March 1998.

SUMMARY OF THE INVENTION

The embodiments of the present invention are proposed with respect to the above problem of the prior art, so as to eliminate one or more defects existing in the prior art, and provide at least one beneficial selection.

In order to achieve the above object, the embodiments of the present invention provide the following aspects.

Aspect 1: A communication apparatus, comprising:

a channel estimating unit for acquiring a channel estimation value of a channel between the communication apparatus and a cell base station of a cell in which the communication apparatus is located, i.e., the channel estimation value between the communication apparatus and the cell base station;

a transmitting unit for transmitting the channel estimation value or information based on the channel estimation value to the cell base station;

a receiving unit for receiving coordinated multipoint (CoMP) message from the cell base station, the CoMP message indicates the CoMP transmission mode, the codebook or precoding matrix used by the cell base station, and the codebook or precoding matrix used by a coordinated base station that coordinates with the cell base station;

a channel matrix forming unit for acquiring a channel matrix according to the CoMP message; and a decoding unit for decoding received signals according to the channel matrix and the CoMP message.

Aspect 2: The communication apparatus according to Aspect 1, wherein the CoMP message indicates that the CoMP transmission mode is a coherent CoMP transmission mode, the channel matrix forming unit forms a channel matrix by performing a channel estimation on antennas of the cell base station and antennas of the coordinated base station, and the decoding unit decodes the received signals by regarding data from the cell base station and data from the coordinated base station as the same data.

Aspect 3: The communication apparatus according to Aspect 1, wherein the CoMP message indicates that the CoMP transmission mode is a first type non-coherent CoMP transmission mode, the channel matrix forming unit forms a channel matrix by performing a channel estimation on antennas of the cell base station and antennas of the coordinated base station, and the decoding unit decodes the received signals by regarding data from the cell base station and data from the coordinated base station as different data.

Aspect 4: The communication apparatus according to Aspect 1, wherein the CoMP message indicates that the CoMP transmission mode is a second type non-coherent CoMP transmission mode, the channel matrix forming unit forms a channel matrix by performing a channel estimation on antennas of the cell base station, and the decoding unit decodes the received signals with respect to data from the cell base station.

Aspect 5: The communication apparatus according to Aspect 1, wherein the channel estimating unit further acquires a channel estimation value between the communication apparatus and the coordinated base station; and the transmitting unit transmits the channel estimation value between the communication apparatus and the coordinated base station to the cell base station.

Aspect 6: The communication apparatus according to Aspect 1, wherein the channel estimating unit further acquiring a channel estimation value of a channel between the communication apparatus and the coordinated base station, i.e., a channel estimation value between the communication apparatus and the coordinated base station; the communication apparatus further comprising a judging unit for determining whether or not to carry out a CoMP transmission; when the CoMP transmission is determined to be carried out, the transmitting unit transmits to the cell base station a request for CoMP transmission, as information based on the channel estimation value.

Aspect 7: The communication apparatus according to Aspect 6, wherein the judging unit further determining the CoMP transmission mode to be adopted, and the codebook or precoding matrix to be used by the cell base station and the coordinated base station; the request transmitted by the transmitting unit to the cell base station has information that indicates the CoMP transmission mode and the codebook or precoding matrix.

Aspect 8: The communication apparatus according to Aspect 7, wherein when the second type non-coherent CoMP transmission mode is determined to be adopted, the judging unit determines the codebook or precoding matrix to be used by the cell base station in a rule maximizing the posterior signal to noise ratio (SNR) or throughput of the communication apparatus, and determines the codebook or precoding matrix to be used by the coordinated base station in a rule minimizing the posterior SNR or throughput of the communication apparatus.

Aspect 9: The communication apparatus according to Aspect 7, wherein when the channel estimation value between the communication apparatus and the cell base station is between a first threshold value and a second threshold value, and the channel estimation value between the communication apparatus and the coordinated base station is between a third threshold value and a fourth threshold value, the judging unit determines that the CoMP transmission shall be carried out; when the channel estimation value between the communication apparatus and the cell base station is below a fifth threshold value located between the first threshold value and the second threshold value, the judging unit determines that the coherent CoMP transmission mode shall be adopted; when the channel estimation value between the communication apparatus and the cell base station is above the fifth threshold value, and the channel estimation value between the communication apparatus and the coordinated base station is above a sixth threshold value located between the third threshold value and the fourth threshold value, the judging unit determines that the first type coherent CoMP transmission mode shall be adopted; and when the channel estimation value between the communication apparatus and the cell base station is above the fifth threshold value, and the channel estimation value between the communication apparatus and the coordinated base station is below the sixth threshold value, the judging unit determines that the second type coherent CoMP transmission mode shall be adopted.

Aspect 10: A base station, comprising:
a receiving unit for receiving from a communication apparatus in a cell served by the base station, a channel estimation value of a channel between the communication apparatus and the base station, i.e. a channel estimation value with the base station;

a judging unit for determining, according to the channel estimation value, whether or not to carry out a coordinated multipoint (CoMP) transmission, the CoMP transmission mode to be adopted, the codebook or precoding matrix to be used by the base station, and the codebook or precoding matrix to be used by a coordinated base station that coordinates with the base station;

a first transmitting unit for informing the coordinated base station of coordination information, which contains information indicating the CoMP transmission mode and the codebook or precoding matrix to be used by the coordinated base, and data to be transmitted by the coordinated base station; and a second transmitting unit for transmitting, to the communication apparatus, information which indicates the CoMP transmission mode to be adopted, the codebook or precoding matrix to be used by the base station, and the codebook or precoding matrix to be used by a coordinated base station that coordinates with the base station, as well as data to be received by the communication apparatus.

Aspect 11: The base station according to Aspect 10, wherein the judging unit determines according to the channel estimation value and a geographical position of the communication apparatus.

Aspect 12: The base station according to Aspect 10, wherein the receiving unit further receives, from the communication apparatus, a channel estimation value of a channel between the communication apparatus and the coordinated base station, i.e., a channel estimation value between the communication apparatus and the coordinated base station; the judging unit determines according to the channel estimation value between communication apparatus and the coordinated base station and the channel estimation value between communication apparatus and the base station.

Aspect 13: The base station according to Aspect 12, wherein when the channel estimation value between the communication apparatus and the base station is between a first threshold value and a second threshold value, and the channel estimation value between the communication apparatus and the coordinated base station is between a third threshold value and a fourth threshold value, the judging unit determines that the CoMP transmission shall be carried out; when the channel estimation value between the communication apparatus and the base station is below a fifth threshold value located between the first threshold value and the second threshold value, the judging unit determines that the coherent CoMP transmission mode shall be adopted; when the channel estimation value between the communication apparatus and the base station is above the fifth threshold value, and the channel estimation value between the communication apparatus and the coordinated base station is above a sixth threshold value located between the third threshold value and the fourth threshold value, the judging unit determines that the first type coherent CoMP transmission mode shall be adopted; and when the channel estimation value between the communication apparatus and the base station is above the fifth threshold value, and the channel estimation value between the communication apparatus and the coordinated base station is below the sixth threshold value, the judging unit determines that the second type coherent CoMP transmission mode shall be adopted.

Aspect 14: The base station according to Aspect 10, wherein when the second type non-coherent CoMP transmission mode is determined to be adopted, the judging unit determines the codebook or precoding matrix to be used by the base station in a rule maximizing the posterior signal to noise ratio (SNR) or throughput of the communication apparatus, and determines the codebook or precoding matrix to be used by the coordinated base station in a rule minimizing the posterior SNR or throughput of the communication apparatus.

Aspect 15: The base station according to Aspect 13, wherein when the judging unit determines that the coherent CoMP transmission mode shall be adopted, the first transmitting unit transmits, to the coordinated base station, data the same as that to be transmitted by the base station to the communication apparatus; when the judging unit determines that the first type coherent CoMP transmission mode shall be adopted, the first transmitting unit transmits, to the coordinated base station, data different from that to be transmitted by the base station to the communication apparatus; when the judging unit determines that the second type coherent CoMP transmission mode shall be adopted, the first transmitting unit does not transmit data to the coordinated base station.

Aspect 16: A coordinated multipoint (CoMP) communication method used in communication apparatus, comprising:

a channel estimation step for acquiring a channel estimation value of a channel between the communication apparatus and a cell base station of a cell in which the communication apparatus is located, i.e. channel estimation value between the communication apparatus and the cell base station;

a transmitting step for transmitting, to the cell base station, the channel estimation value or information based on the channel estimation value;

a receiving step for receiving a CoMP message from the cell base station, the CoMP message indicates the CoMP transmission mode, the codebook or precoding matrix used by the cell base station, and the codebook or precoding matrix used by a coordinated base station that coordinates with the cell base station;

a channel matrix forming step for acquiring a channel matrix according to the CoMP message; and a decoding step for decoding received signals according to the channel matrix and the CoMP message.

Aspect 17: The CoMP communication method according to Aspect 16, wherein the CoMP message indicates that the CoMP transmission mode is a coherent CoMP transmission mode, the channel matrix forming step forms a channel matrix by performing a channel estimation on antennas of the cell base station and antennas of the coordinated base station, and the decoding step decodes the received signals by regarding data from the cell base station and data from the coordinated base station as the same data.

Aspect 18: The CoMP communication method according to Aspect 16, wherein the CoMP message indicates that the CoMP transmission mode is a first type non-coherent CoMP transmission mode, the channel matrix forming step forms a channel matrix by performing a channel estimation on antennas of the cell base station and antennas of the coordinated base station, and the decoding step decodes the received signals by regarding data from the cell base station and data from the coordinated base station as different data.

Aspect 19: The CoMP communication method according to Aspect 16, wherein the CoMP message indicates that the CoMP transmission mode is a second type non-coherent CoMP transmission mode, the channel matrix forming step forms a channel matrix by performing a channel estimation on antennas of the cell base station, and the decoding step decodes the received signals with respect to data from the cell base station.

Aspect 20: The CoMP communication method according to Aspect 16, wherein the channel estimating step further acquires a channel estimation value between the communication apparatus and the coordinated base station; and the transmitting step transmits the channel estimation value between the communication apparatus and the coordinated base station to the cell base station.

Aspect 21: The CoMP communication method according to Aspect 16, wherein the channel estimating step further acquiring a channel estimation value of a channel between the communication apparatus and the coordinated base station, i.e., a channel estimation value between the communication apparatus and the coordinated base station; the CoMP communication method further comprising a judging step for determining whether or not to carry out a CoMP transmission; when the CoMP transmission is determined to be carried out, the transmitting step transmits to the cell base station a request for CoMP transmission, as information based on the channel estimation value.

Aspect 22: The CoMP communication method according to Aspect 21, wherein the judging step further determining the CoMP transmission mode to be adopted, and the codebook or precoding matrix to be used by the cell base station and the coordinated base station; the request transmitted by the transmitting step to the cell base station has information that indicates the CoMP transmission mode and the codebook or precoding matrix.

Aspect 23: A base station, comprising:

a receiving unit for receiving from a communication apparatus in a cell served by the base station, a request that requires performing a coordinated multipoint (CoMP) transmission, the request comprising information that indicates the CoMP transmission mode to be adopted, the codebook or precoding matrix to be used by the base station and the codebook or precoding matrix to be used by a coordinated base station coordinating with the base station;

a first transmitting unit for informing the coordinated base station of coordination information, which contains information indicating the CoMP transmission mode, the codebook or precoding matrix to be used by the coordinated base, and data to be transmitted by the coordinated base station; and a second transmitting unit for transmitting, to the communication apparatus, a confirmation of the request and data to be received by the communication apparatus.

Aspect 24: The base station according to Aspect 23, further comprising a judging unit for determining whether or not to receive the request.

According to the embodiments of the present invention, the base stations can well coordinate with each other to provide services to the mobile station, so as to improve the service quality.

BRIEF DESCRIPTION OF THE DRAWINGS

The above and other objects, features and advantages of the present invention can be understood more easily through the following descriptions of the embodiments of the present invention in conjunction with the drawings. The parts in the drawings are not drafted in scale, and just for illustrating the principle of the present invention. For the convenience of illustrating and describing some parts of the present invention, corresponding parts in the drawings may be enlarged, i.e., these parts are enlarged with respect to other parts in an exemplary apparatus practically manufactured according to the present invention. In the drawings, same or corresponding reference signs are used to represent same or corresponding technical features or parts.

DETAILED DESCRIPTION OF THE PREFERRED EMBODIMENTS

Figure 1:
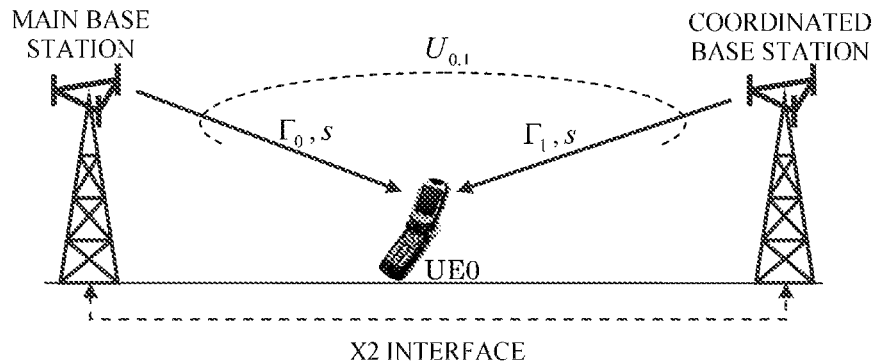
FIG. 1 illustrates a coherent CoMP transmission mode according to an embodiment of the present invention.

The embodiments of the present invention are described with reference to the drawings. To be noted, for the purpose of clearness, representations and descriptions of parts and processing unrelated to the present invention and having been known by a person skilled in the art are omitted in the drawings and the Description.

The Description and drawings disclose the specific embodiments of the present invention in details, and point out the ways in which the principle of the present invention may be adopted. It shall be appreciated that the range of the present invention is not limited thereby. In the range of the spirit and provisions of the accompanied claims, the present invention includes many changes, modifications and equivalents.

The features described and/or illustrated with respect to one embodiment may be used in one or more other embodiments in the same or similar way, combined with the features in other embodiments, or replace the features in other embodiments.

It shall be emphasized that the term "comprise/include/have" or "comprising/including/having" used herein specify the presence of features, elements, steps or components, but does not preclude the presence or addition of one or more other features, elements, steps, or components.

According to the embodiments of the present invention, the main base station and the coordinated base station may perform a multipoint coordination with the mobile station by adopting a coherent CoMP transmission mode, a first type non-coherent CoMP transmission mode and a second type non-coherent CoMP transmission mode. The three CoMP transmission modes are introduced as follows.

The Description assumes that in the coordinated communication, the long-term statistical signal power of the main base station is larger than that of other coordinated base station (also called as adjacent base station).

FIG. 1 illustrates a coherent CoMP transmission mode according to an embodiment of the present invention. As illustrated in FIG. 1, under this mode the main base station and the coordinated base station serve one mobile station together, and pre-code the same data with the same or different codebooks. After being pre-coded, the data S is transmitted to the mobile station through the main base station and the coordinated base station. In that case, the mobile station must perform a channel estimation of channels $\Gamma_0(k,l)$ and $\Gamma_1(k,l)$ simultaneously. The main base station may select codebooks $U_0$ and $U_1$ for itself and the coordinated base station respectively, according to a result of the channel estimation. Alternatively, the mobile station may select codebooks $U_0$ and $U_1$ for the main base station and the coordinated base station respectively, according to the result of the channel estimation. In addition, the main base station may select the codebook $U_0$ for itself according to the result of the channel estimation, and the coordinated base station may select the codebook $U_1$ according to the codebook $U_0$. The signals received by the mobile station are only interfered by the AWGN noise.

Figure 2:
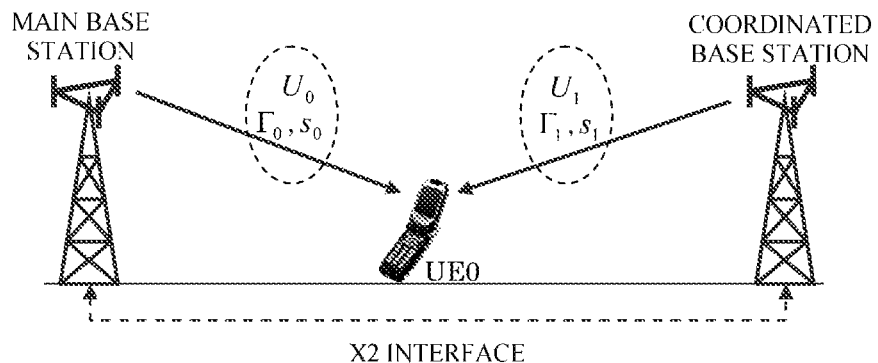
FIG. 2 illustrates a first type non-coherent CoMP transmission mode according to an embodiment of the present invention.

FIG. 2 illustrates a first type non-coherent CoMP transmission mode according to an embodiment of the present invention. As illustrated in FIG. 2, under this mode the main base station and the coordinated base station serve one mobile station together, use the same or different codebooks and transmit different data. In that case, the mobile station must perform a channel estimation of channels $\Gamma_0(k,l)$ and $\Gamma_1(k,l)$ simultaneously. The main base station may select codebooks $U_0$ and $U_1$ for itself and the coordinated base station respectively, according to a result of the channel estimation. Alternatively, the mobile station may select codebooks $U_0$ and $U_1$ for the main base station and the coordinated base station respectively, according to the result of the channel estimation. In addition, the main base station may select the codebook $U_0$ for itself according to the result of the channel estimation, and the coordinated base station may select the codebook $U_1$ according to the codebook $U_0$.

While data $S_0$ transmitted by the main base station is transmitted to the mobile station after being pre-coded with $U_0$, data $S_1$ transmitted by the coordinated base station is transmitted to the mobile station after being pre-coded with $U_1$. The signals received by the mobile station include not only a useful signal $S_0$ from the main base station and a useful signal $S_1$ from the coordinated base station, but also a mutual interference value of the two signals since the codebooks are not completely ideal. In addition, the signals are also interfered by the AWGN noise.

Figure 3:
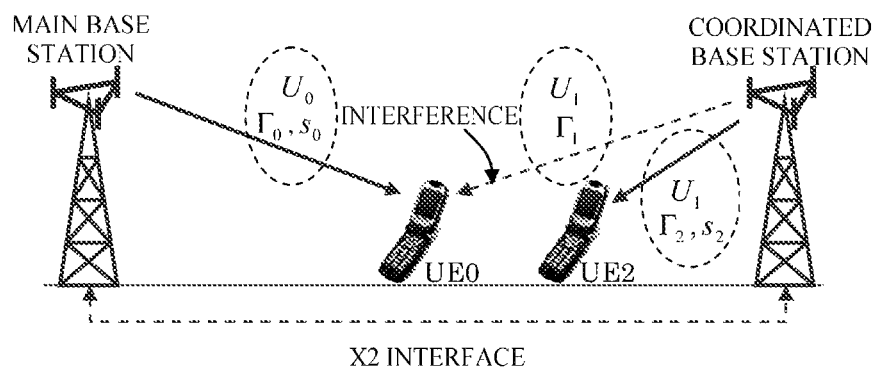
FIG. 3 illustrates a second type non-coherent CoMP transmission mode according to an embodiment of the present invention.

FIG. 3 illustrates a second type non-coherent CoMP transmission mode according to an embodiment of the present invention. As illustrated in FIG. 3, under this mode the main base station and the coordinated base station serve different mobile stations respectively, use different or the same codebooks and transmit different data. In that case, the mobile station performs a channel estimation of channels $\Gamma_0(k,l)$ and $\Gamma_1(k,l)$ simultaneously. The main base station may select codebooks $U_0$ and $U_1$ for itself and the coordinated base station respectively, according to a result of the channel estimation. Alternatively, the mobile station may select codebooks $U_0$ and $U_1$ for the main base station and the coordinated base station respectively, according to the result of the channel estimation. In addition, the main base station may select the codebook $U_0$ for itself according to the result of the channel estimation, and the coordinated base station may select the codebook $U_1$ according to the codebook $U_0$. Data $S_0$ transmitted by the main base station is transmitted to a mobile station served by the main base station after being pre-coded with $U_0$, data $S_1$ transmitted by the coordinated base station is transmitted to a mobile station served by the coordinated base station after being pre-coded with $U_1$. The signals received by the mobile station served by the main base station include not only a useful signal $S_0$ from the main base station, but also an interference from the data $S_1$ signal transmitted from the coordinated base station since the codebooks are not completely ideal. In addition, the signals are also interfered by the AWGN noise.

In the second type non-coherent CoMP transmission mode, one of the codebooks $U_0$ and $U_1$ adopted by the main base station and the coordinated base station maximizes a posterior signal to noise ratio (SNR) (throughput) of the mobile station, while the other minimizes the SNR (throughput) of the mobile station. The base station using the codebook that maximizes the SNR (throughput) of the mobile station transmits the signal serving the mobile station, and the base station using the codebook that minimizes the SNR (throughput) of the mobile station transmits the signal serving the other mobile station.

Figure 4:
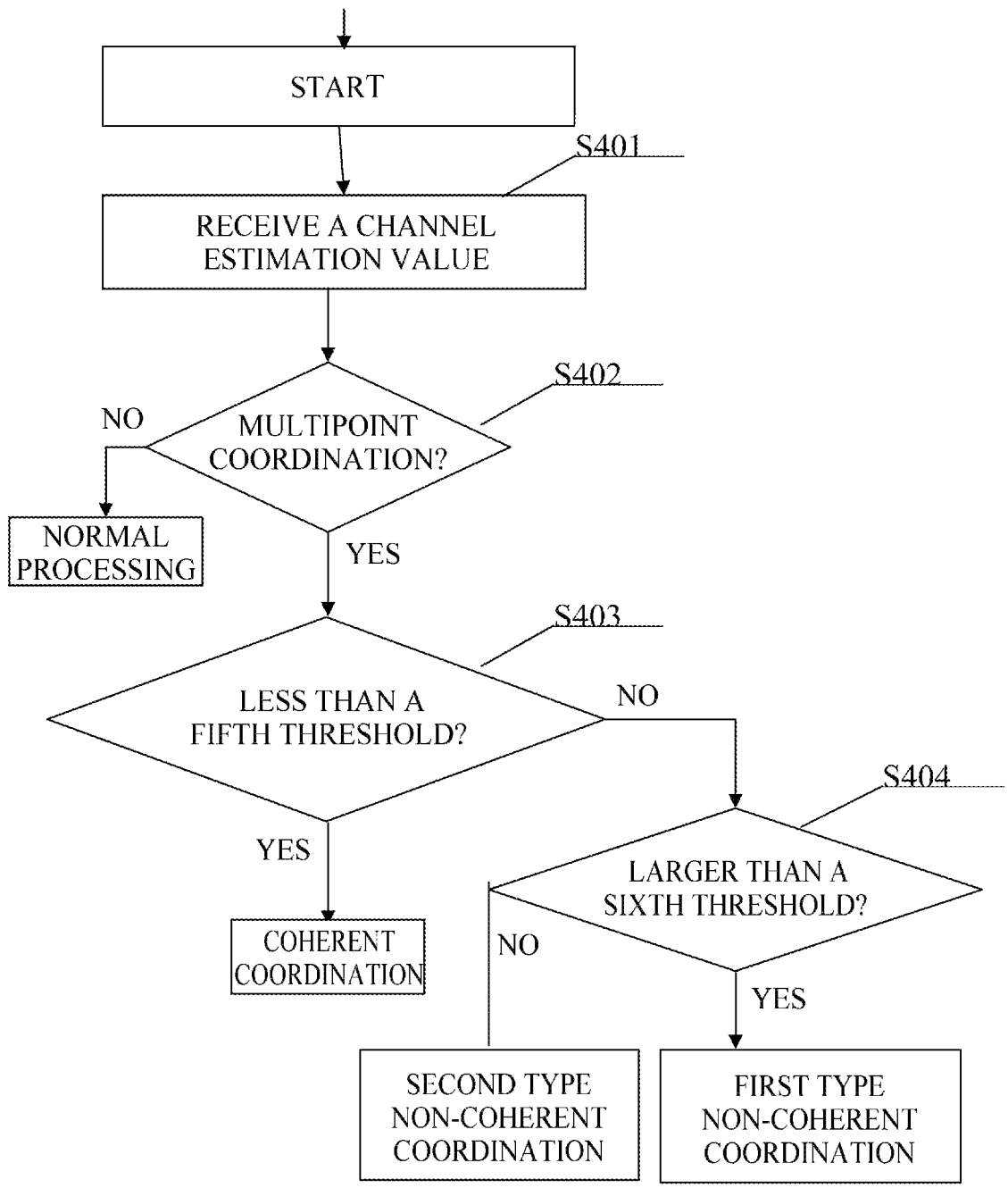
FIG. 4 illustrates a flowchart of an exemplary embodiment in which a main base station selects a transmission mode.

FIG. 4 illustrates a flowchart of an exemplary embodiment in which a main base station selects a transmission mode. As illustrated in FIG. 4, firstly in step S401, the main base station receives, from a mobile station, channel estimation values between the main base station and the mobile station and between the mobile station and an adjacent base station (another base station adjacent to the main base station). In the embodiment of the present invention, each mobile station shall perform a channel estimation for the main base station and respective adjacent base stations.

Next, in step S402, the main base station determines whether or not a multipoint coordination shall be carried out according to the current channel condition. For example, in one embodiment, it is determined that a multipoint coordination shall be carried out when the channel estimation value between the main base station and the mobile station is less than a first threshold and larger than a second threshold, while the channel estimation value between the adjacent base station and the mobile station is less than a third threshold and larger than a fourth threshold.

When the channel estimation value between the main base station and the mobile station is larger than the first threshold, it means that the channel between the main base station and the mobile station is very good and a multipoint coordination is not needed. When the channel estimation value between the main base station and the mobile station is less than the second threshold, it means that the channel between the main base station and the mobile station is very poor and the main base station is unable to perform a multipoint coordination, thus in that case, it is determined as unnecessary to carry out a multipoint coordination. On the other hand, when the channel estimation value between the adjacent base station and the mobile station is larger than the third threshold, it means that the channel between the adjacent base station and the mobile station is very good and a multipoint coordination is not needed. When the channel estimation value between the adjacent base station and the mobile station is less than the fourth threshold, it means that the channel between the adjacent base station and the mobile station is very poor and the adjacent base station is unable to perform a multipoint coordination.

To be noted, in another embodiment, it is unnecessary to determine whether the channel estimation value between the adjacent base station and the mobile station is larger than the third threshold, and it is directly assumed that the channel estimation value is less than the third threshold.

When it is determined in step S402 that a multipoint coordination shall be carried out, the main base station further determines what type of CoMP transmission mode shall be adopted. For this purpose, according to one embodiment of the present invention, in step S403, the main base station determines whether the channel estimation value between the main base station and the mobile station is less than a fifth threshold that ranges between the first and second thresholds, and if so, the coherent CoMP transmission mode shall be adopted. On the other hand, when it is determined in step S403 that the channel estimation value between the main base station and the mobile station is not less than the fifth threshold, it is determined in step S404 whether the channel estimation value between the adjacent base station and the mobile station is larger than a sixth threshold that ranges between the third and fourth thresholds, and if so, it determined that the first type non-coherent CoMP transmission mode shall be adopted, or if not, it determined that the second type non-coherent CoMP transmission mode shall be adopted.

Figure 5:
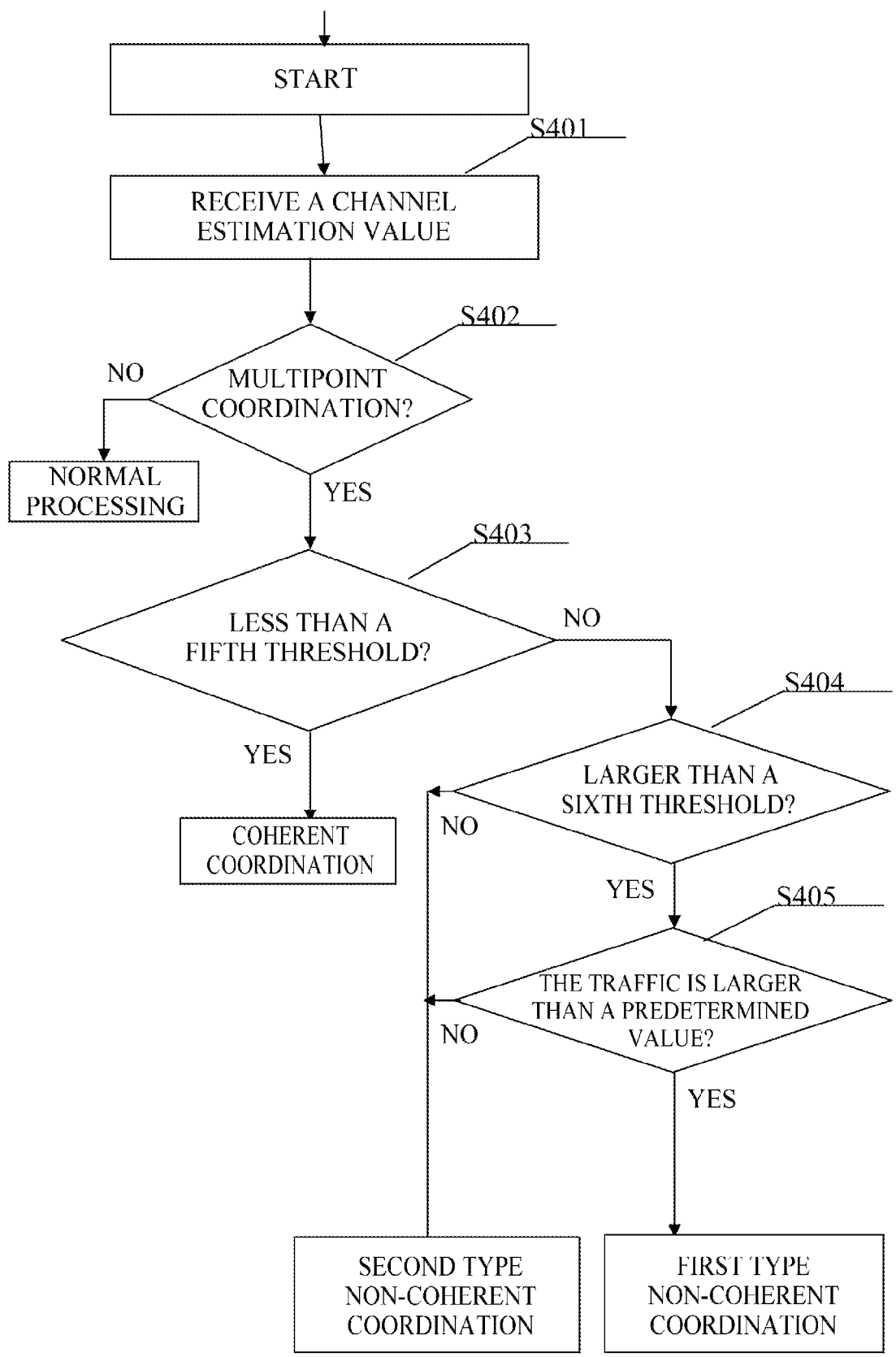
FIG. 5 illustrates a flowchart of another exemplary embodiment in which a main base station selects a transmission mode.

FIG. 5 illustrates a flowchart of another exemplary embodiment in which a main base station selects a transmission mode. The flows illustrated in FIG. 5 are substantially the same as those illustrated in FIG. 4, and the only difference is as follows: when it is determined in step S404 that the channel estimation value between the adjacent base station and the mobile station is larger than the sixth threshold, it is further determined in step S405 whether the data traffic is larger than a predetermined value, and if so, the first type non-coherent CoMP transmission mode shall be adopted, or if not, the second type non-coherent CoMP transmission mode shall be adopted.

Furthermore, in an alternative embodiment, the mobile station may not measure the channel estimation value between itself and the coordinated base station, but merely measure the channel estimation value between itself and the main base station. The main base station infers the channel estimation value between the mobile station and the coordinated base station according to a geographical position of the mobile station, thereby judging whether a CoMP transmission mode shall be adopted, and what type of CoMP transmission mode shall be adopted.

In addition, although the main base station determines in FIGS. 4-5 whether and what type of CoMP transmission mode shall be adopted, such determination may be carried out by the mobile station. In that case, for example the step of receiving the channel estimation value in step S401 may be changed as a step of performing a channel estimation.

Figure 6A:
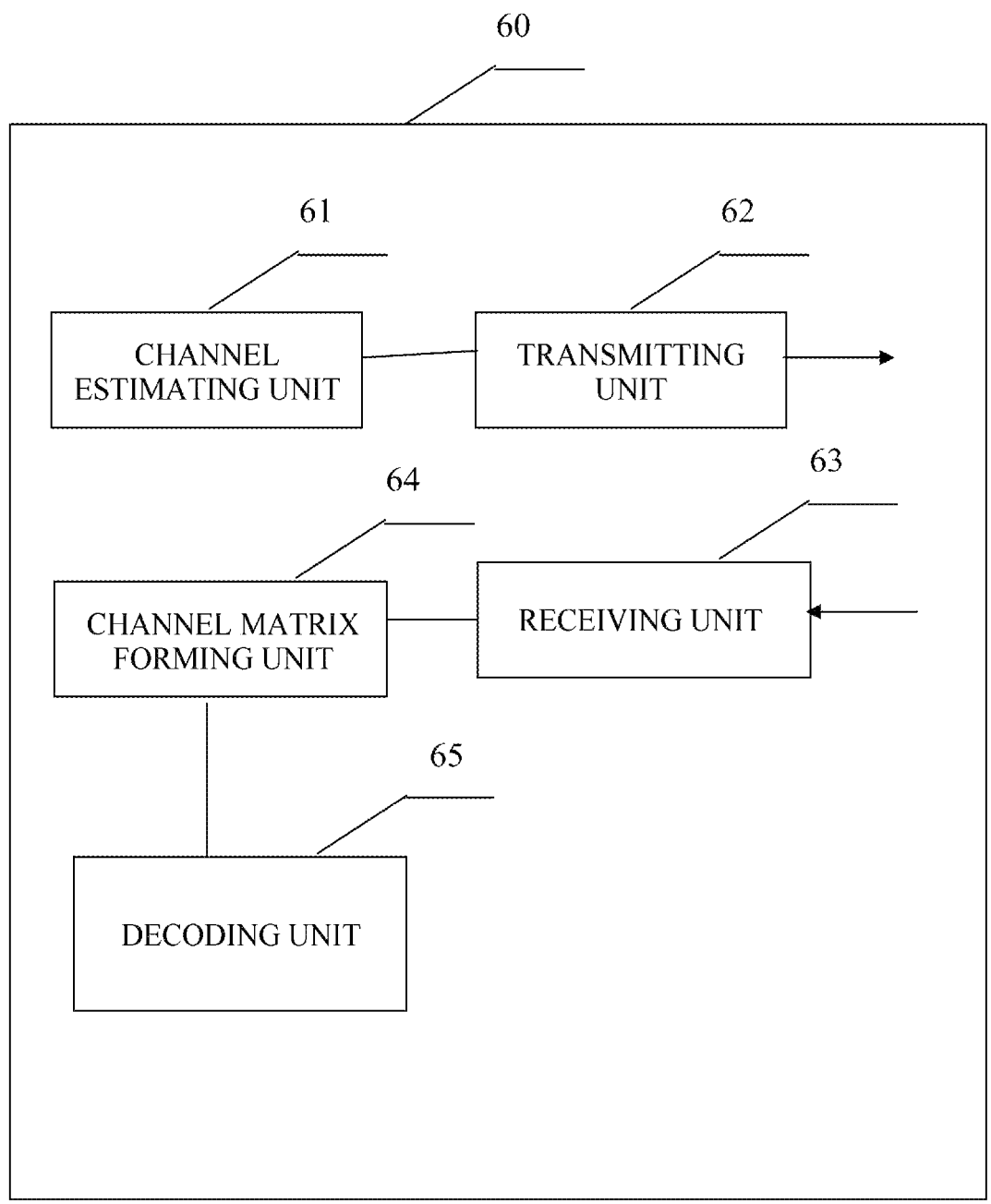
FIG. 6A illustrates a mobile station according to an embodiment of the present invention.

FIG. 6A illustrates a mobile station according to an embodiment of the present invention. In the embodiment of the present invention, it is assumed that the receiver adopts a Minimum Mean Squared Error (MMSE) detection, and the receiver is fully synchronous with each base station in time while receiving the signal transmitted from each base station. If the time is not synchronous, a time error may be compensated through a simple linear phase adjustment.

As illustrated in FIG. 6A, according to an embodiment of the present invention, a mobile station 60 includes a channel estimating unit 61, a transmitting unit 62, a receiving unit 63, a channel matrix forming unit 64 and a decoding unit 65.

The channel estimating unit 61 estimates a channel estimation value between the mobile station and a main base station, and a channel estimation value between the mobile station and an adjacent base station. The transmitting unit 62 transmits the estimated channel estimation values to the main base station. Alternatively, the transmitting unit 62 may transmit, to the adjacent base station, the estimated channel estimation value between the mobile station and the adjacent base station.

To be noted, in some communication systems (e.g., TTD system), the uplink and downlink channels are symmetrical with each other. In that case, the channel estimating unit 61 may merely estimate the channel estimation value between the mobile station and the adjacent base station.

The receiving unit 63 receives, from the main base station, information that indicates whether or not to enter the CoMP transmission mode, what type of CoMP transmission mode shall be adopted when entering the CoMP transmission mode, and the codebooks to be used by the main base station and the coordinated base station. For example, the above information may be transmitted via a CIPCH under the CDMA, or a PDCCH under the LTE system. In addition, the receiving unit further receives data from the main base station and/or adjacent base station.

When being informed of entering the coherent CoMP transmission mode or the first type non-coherent CoMP transmission mode, the channel matrix forming unit 64 forms a channel matrix by performing a channel estimation of the antenna of the main base station and the antenna of the adjacent base station; and when being informed of entering the second type non-coherent CoMP transmission mode, the channel matrix forming unit 64 forms a channel matrix by performing a channel estimation of the antenna of the base station serving the user.

The decoding unit 65 decodes the data from the main base station and the adjacent base station, according to the channel matrix and the CoMP transmission mode informed by the main base station. In details, when being informed of entering the coherent CoMP transmission mode, the decoding unit 65 regards data received by the receiving unit 63 in the same resource from different base stations as the same data and then decodes the data. In the embodiment of the present invention, the same resource refers to sub-carrier resources of the same time and symbol. When being informed of entering the first type non-coherent CoMP transmission mode, the decoding unit 65 regards data received by the receiving unit 63 in the same resource from different base stations as different data and then decodes the data. The known MMSE receiver, ZF receiver, etc. may be adopted for the decoding.

When being informed of not to enter the CoMP transmission mode or entering the second type non-coherent CoMP transmission mode, the processing made by the mobile station is the same as that in the prior art. Thus, in one embodiment, the main base station may merely inform the mobile station of entering the coherent CoMP transmission mode or the second type non-coherent CoMP transmission mode.

Figure 6B:
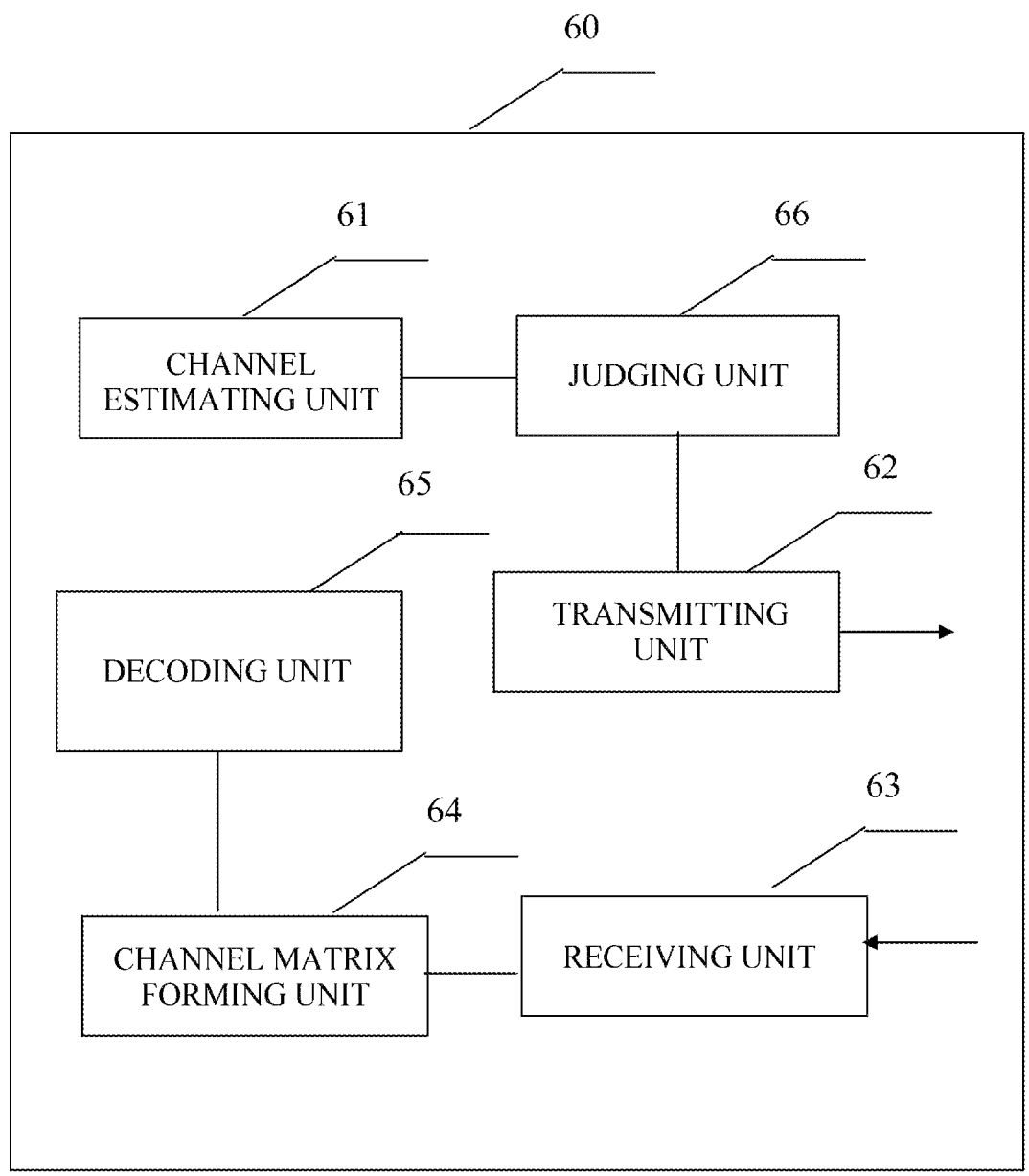
FIG. 6B illustrates a mobile station according to another embodiment of the present invention.

FIG. 6B illustrates a mobile station according to another embodiment of the present invention. As compared with that illustrated in FIG. 6A, the mobile station illustrated in FIG. 6B is added with a judging unit 66, which determines, according to the channel estimation value estimated by the channel estimating unit 61, whether or not to carry out a CoMP transmission, what type of CoMP transmission mode shall be adopted, and the codebooks to be used by the main base station and the coordinated base station. When the judging unit 66 determines that a CoMP transmission shall be carried out, a request, which contains the determined CoMP transmission mode and codebooks and requires entering the CoMP transmission mode, is transmitted to the main base station.

In an optional embodiment, the judging unit 66 may merely determine whether or not to carry out a CoMP transmission and what type of CoMP transmission mode shall be adopted, without determining the codebooks to be used by the main base station and the coordinated base station.

The receiving unit 63 receives, from the main base station, a notification indicating whether or not to accept the request from the mobile station. In one embodiment, the notification further includes a determined CoMP transmission mode, and the codebooks to be used by the main base station and the coordinated base station.

Figure 7:
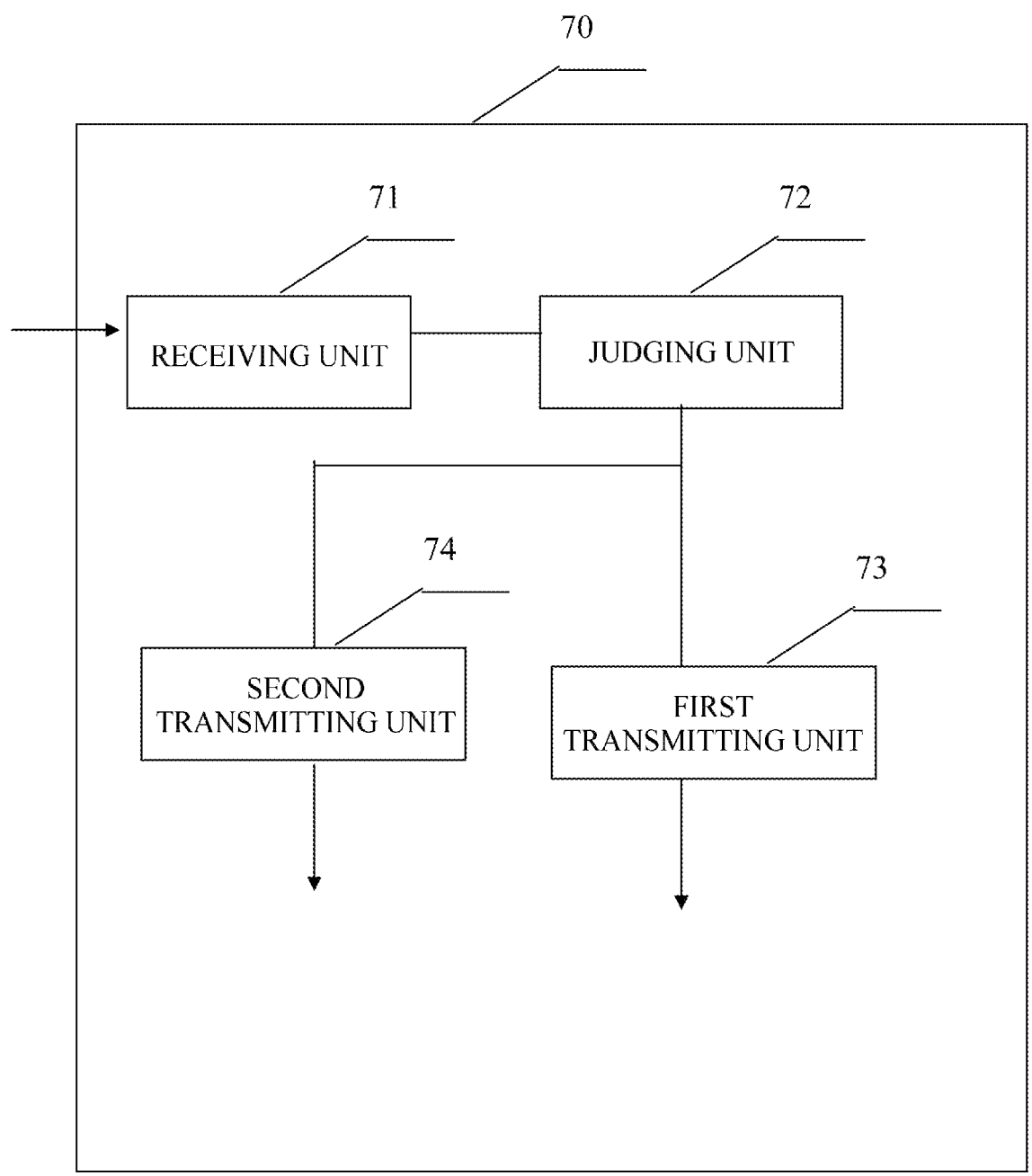
FIG. 7 illustrates a schematic functional block diagram of a main base station according to an embodiment of the present invention.

FIG. 7 illustrates a schematic functional block diagram of a main base station according to an embodiment of the present invention. As illustrated in FIG. 7, according to an embodiment of the present invention, a main base station 70 includes a receiving unit 71, a judging unit 72, a first transmitting unit 73 and a second transmitting unit 74.

The receiving unit 71 receives a channel estimation value or a pre-coding matrix value from a mobile station. In the TDD system, in case the mobile station does not transmit the channel estimation value between itself and the main base station, the main base station may further include a channel estimating unit that estimates a channel estimation value between the main base station and the mobile station.

The judging unit 72 determines, base on the channel estimation value or the pre-coding matrix, whether or not to enter the CoMP transmission mode, and what type of CoMP transmission mode shall be adopted when entering the CoMP transmission mode. In addition, the judging unit 72 further determines the Modulation and Coding Scheme (MCS) and the codebooks and the like to be used by the main base station and the coordinated base station. When determining the MCS and the codebooks to be used, a principle of maximizing the posterior SNR or throughput may be adopted.

The principle of maximizing the posterior SNR adopted to determine the codebooks and the MCS is to select, under a certain decoding algorithm (e.g., zero forcing algorithm or MMSE algorithm), codebooks maximizing the posterior SNR of the system and select corresponding MCS according to the acquired posterior SNR.

The principle of maximizing the throughput adopted to determine the codebooks and the MCS is to select, under a certain decoding algorithm (e.g., zero forcing algorithm or MMSE algorithm) and a target frame error rate of the system, codebooks and MCS maximizing the throughput of the system.

When it is determined to enter a CoMP transmission mode, the first transmitting unit 73 for example informs the coordinated base station of the selected CoMP transmission mode through an interface (e.g., X2 interface) between the base stations, and transmits to the coordinated base station, data to be transmitted from the coordinated base station to the mobile station in case relevant CoMP transmission mode is selected. The data is the same as that to be transmitted from the main base station to the mobile station. In case the first type non-coherent CoMP transmission mode is selected, data to be transmitted from the coordinated base station to the mobile station is transmitted to the coordinated base station. The data is different from that to be transmitted from the main base station to the mobile station. In addition, the first transmitting unit 73 further transmits data transmission information indicating the codebook (pre-coding matrix), the MCS, etc. The first transmitting unit 73 may directly transmit information indicating the codebook, the MCS, etc. to be used by the coordinated base station. In another embodiment, the codebook used by the main base station may be transmitted, and the coordinated base station determines a codebook to be used by itself according to the codebook used by the main base station. The data transmission information, the data, etc. transmitted to the coordinated base station by the first transmitting unit 73 being generally called as coordination information.

When it is determined to adopt the multipoint coordination, the second transmitting unit 74 transmits to the mobile station a CoMP message indicating a CoMP transmission mode to be used. In one embodiment, the second transmitting unit 74 further transmits to the mobile station the information on MCSs and codebooks respectively used by the main base station and the coordinated base station. In an alternative embodiment, the second transmitting unit 74 only transmits to the mobile station the information on the MCS and codebook used by the main base station, while those used by the coordinated base station is not transmitted.

Figure 8:
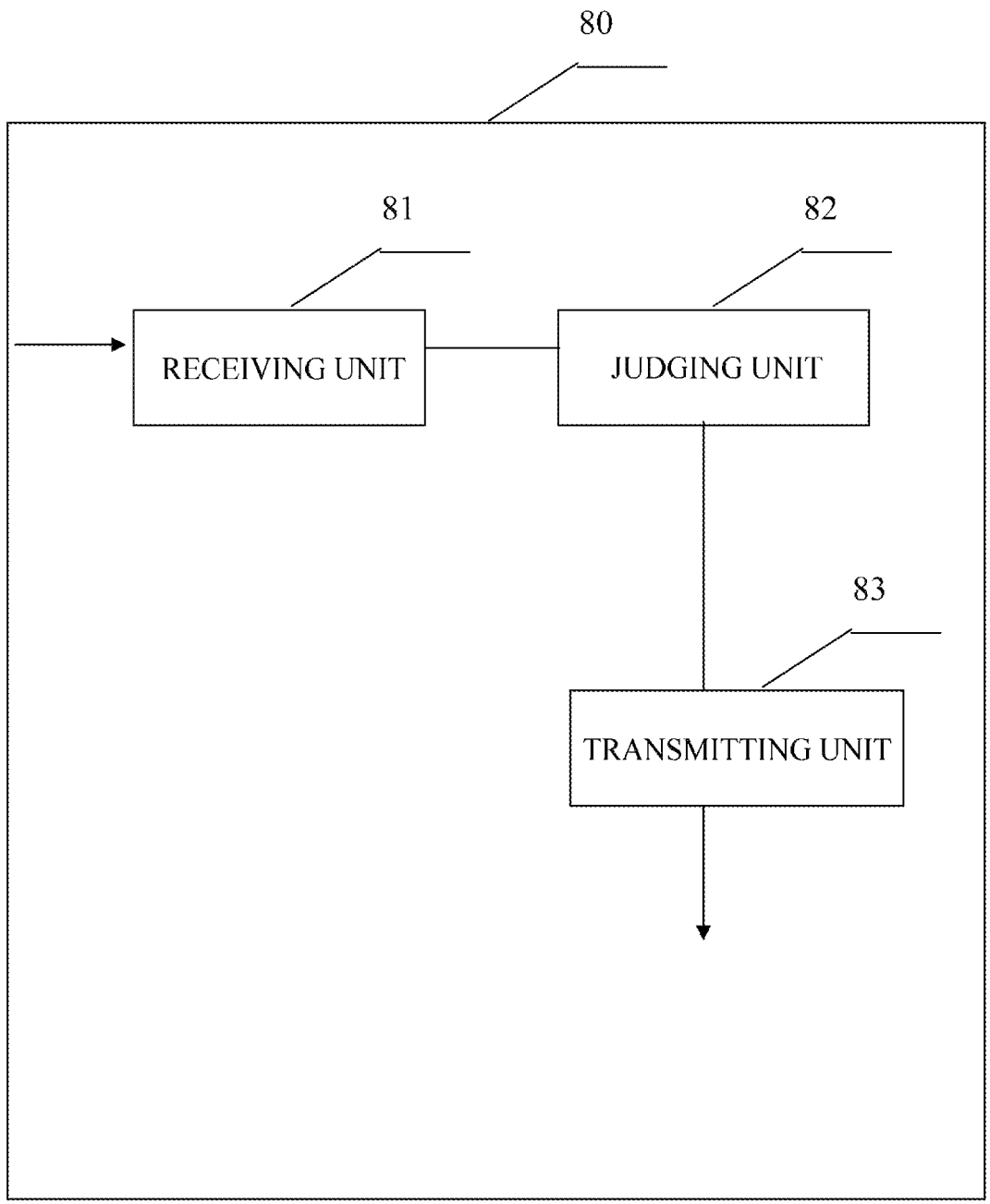
FIG. 8 illustrates a schematic functional block diagram of a coordinated base station according to an embodiment of the present invention.

FIG. 8 illustrates a schematic functional block diagram of a coordinated base station according to an embodiment of the present invention. As illustrated in FIG. 8, according to an embodiment of the present invention, a coordinated base station 80 includes a receiving unit 81, a determining unit 82 and a transmitting unit 83.

The receiving unit 81 receives from a main base station, data to be transmitted and information indicating whether or not to enter the CoMP transmission mode, what type of CoMP transmission mode shall be adopted, and the MCS and codebook (pre-coding matrix) to be used.

The determining unit 82 determines, according to information from the main base station, the MCS and codebook (pre-coding matrix) to be used by the coordinated base station. In case the main base station directly indicates the MCS and codebook (pre-coding matrix) to be used, the determining unit 82 directly determines the indicated MCS and codebook as the MCS and codebook (pre-coding matrix) to be used. In case the main base station does not make a direct indication, but merely gives information indicating the MCS and codebook used by the main base station and a channel estimation value between the mobile station and the coordinated base station, the determining unit 82 determines the MCS and codebook (pre-coding matrix) to be used according to the information.

When it is indicated to enter the CoMP transmission mode, the transmitting unit 83 transmits data to the mobile station according to the MCS and codebook determined by the determining unit 82. When entering the coherent CoMP transmission mode or the first type non-coherent CoMP transmission mode, the transmitting unit 83 transmits the data received by the receiving unit from the main base station. Under the second type non-coherent CoMP transmission mode, the transmitting unit 83 does not transmit any data to the mobile station requiring the CoMP service, but transmits data to the mobile station served by the coordinated base station using the MCS and codebook informed by the main base station, so as to minimize the interference on the mobile station requiring the CoMP service. In that case, since the data of the coordinated base station is in fact also received by the mobile station (as interference), such data and the data received from the main base station is generally called as coordination data.

To be noted, although neither described above nor illustrated in the drawings, the mobile station and each base station include various other units necessary to implement their functions. These other units for example include a control unit (e.g., CPU) for controlling respective parts of the mobile station and the base station, a storage unit for storing data and codebook, and an interface unit (e.g., display and operation key) for the worker's or user's convenience of operation.

Figure 9:
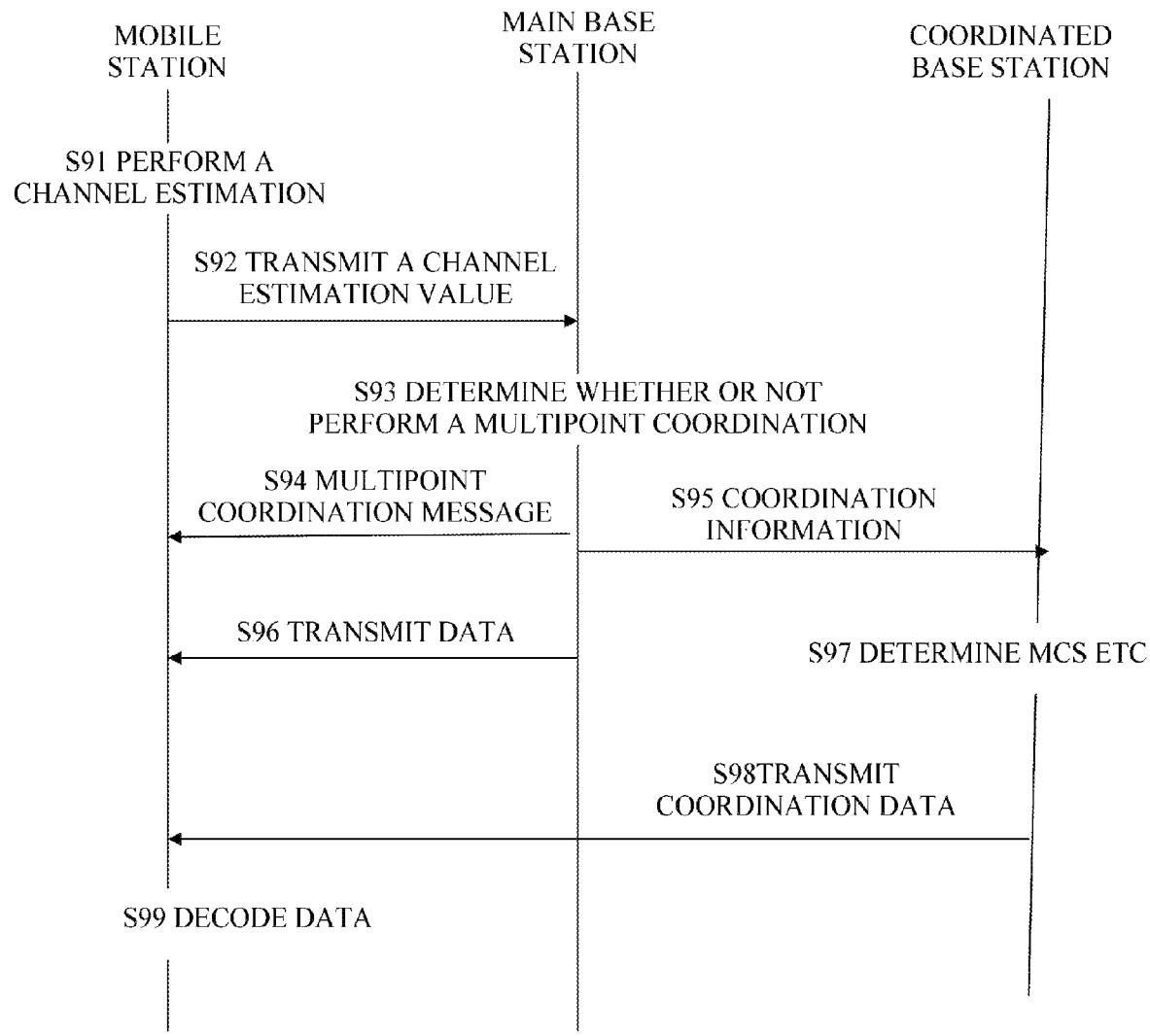
FIG. 9 illustrates a process flowchart of an embodiment of a communication system composed of a mobile station, a main base station and a coordinated base station.

FIG. 9 illustrates a process flowchart of an embodiment of a communication system composed of a mobile station, a main base station and a coordinated base station. Although only one coordinated base station is illustrated in FIG. 9, it shall be noted that there may be several coordinated base stations.

As illustrated in FIG. 9, in the communication system according to an embodiment of the present invention, firstly the mobile station carries out a channel estimation (S91) to estimate channel estimation values of a channel between the mobile station and the main base station and a channel between the mobile station and the coordinated base station. Next, the mobile station transmits the channel estimation values to the main base station (S92). The main base station determines whether to perform a multipoint coordination and what type of CoMP transmission mode shall be adopted when the multipoint coordination is to be performed according to the received channel estimation values (S93). Next, when it is determined to perform the multipoint coordination, a CoMP message, which indicates the type of the CoMP transmission mode as well as the MCSs and codebooks used by the main base station and the coordinated base station, is transmitted to the mobile station (S94); while coordination information, which includes data (in case of the coherent coordination or the first type non-coherent coordination) and data transmission information indicating the CoMP transmission mode, the MCS and the codebook, is transmitted to the coordinated base station (S95), and the data is transmitted to the mobile station (S96).

After receiving the coordination information from the main base station, the coordinated base station determines the MCS and the codebook (pre-coding matrix) to be used (S97), and then transmits coordination data (S98). Next, the mobile station decodes the data from the main base station and the coordinated base station according to a CoMP message transmitted by the main base station (S99).

Figure 10:
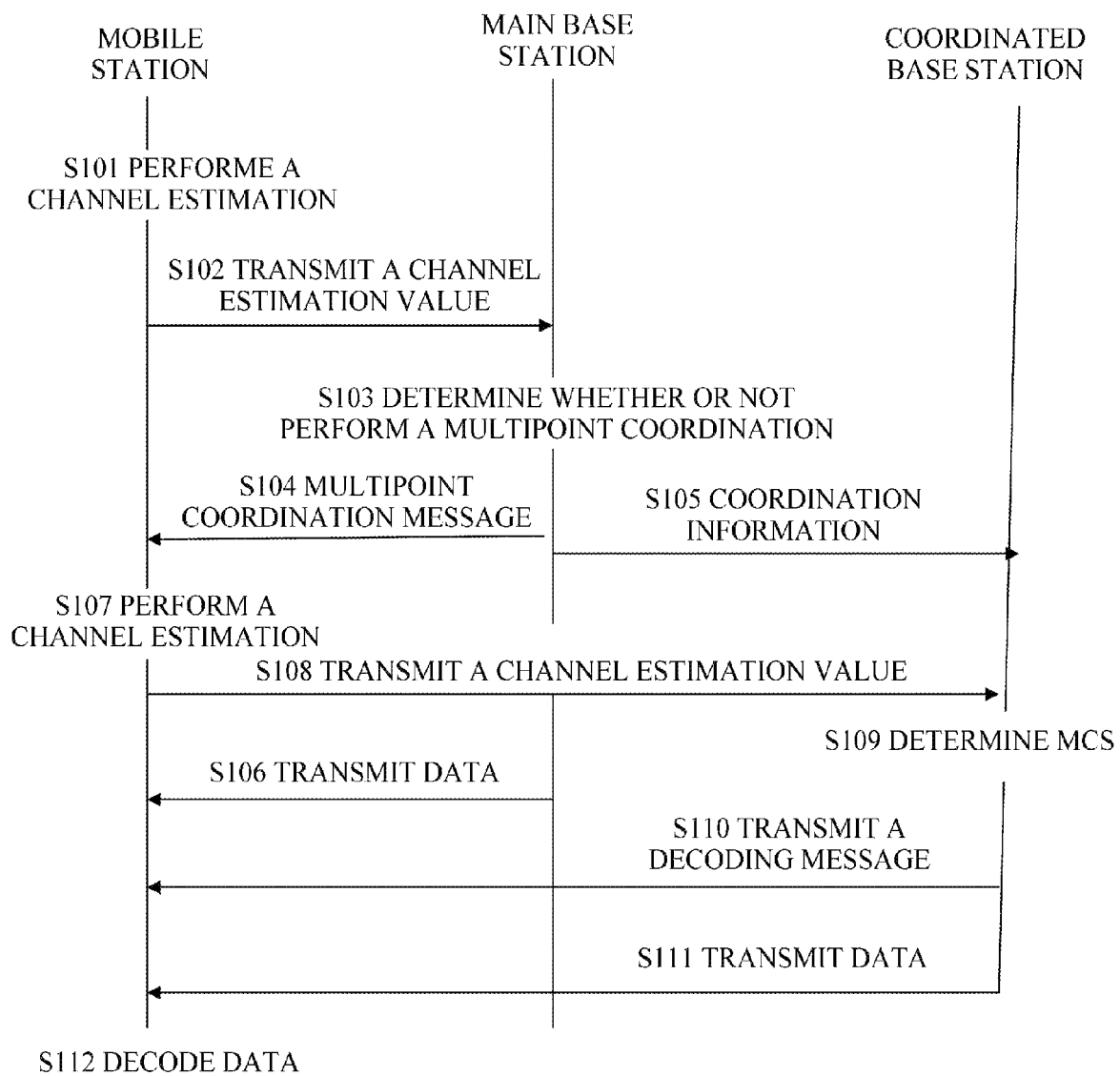
FIG. 10 illustrates a process flowchart of another embodiment of a communication system composed of a mobile station, a main base station and a coordinated base station.

FIG. 10 illustrates a process flowchart of another embodiment of a communication system composed of a mobile station, a main base station and a coordinated base station.

As illustrated in FIG. 10, in the communication system according to an embodiment of the present invention, firstly the mobile station carries out a channel estimation (S101) to estimate only a channel estimation value of a channel between the mobile station and the main base station. Next, the mobile station transmits the channel estimation value to the main base station (S102). The main base station determines whether to perform a multipoint coordination and what type of CoMP transmission mode shall be adopted when the multipoint coordination is to be performed, according to the received channel estimation value and a geographical position of the mobile station (S103). Next, when it is determined to perform the multipoint coordination, a CoMP message, which indicates the type of the CoMP transmission mode and the MCS and codebook used by the main base station, is transmitted to the mobile station (S104); while coordination information, which includes data (in case of the coherent coordination or the first type non-coherent coordination) and data transmission information indicating the CoMP transmission mode, the MCS and the codebook, is transmitted to the coordinated base station (S105), and the data is transmitted to the mobile station (S106).

After receiving the CoMP message from the main base station, the mobile station performs a channel estimation (S107) and transmits a channel estimation value to the coordinated base station (S108). After receiving the coordination information from the main base station and the channel estimation value from the mobile station, the coordinated base station determines the MCS and the codebook to be used (S109), then transmits the determined decoding information to the mobile station (S110) and transmits coordination data (S111). Next, the mobile station decodes the data from the main base station and the coordinated base station according to the CoMP message from the main base station and the decoding information from the coordinated base station (S112).

Figure 11:
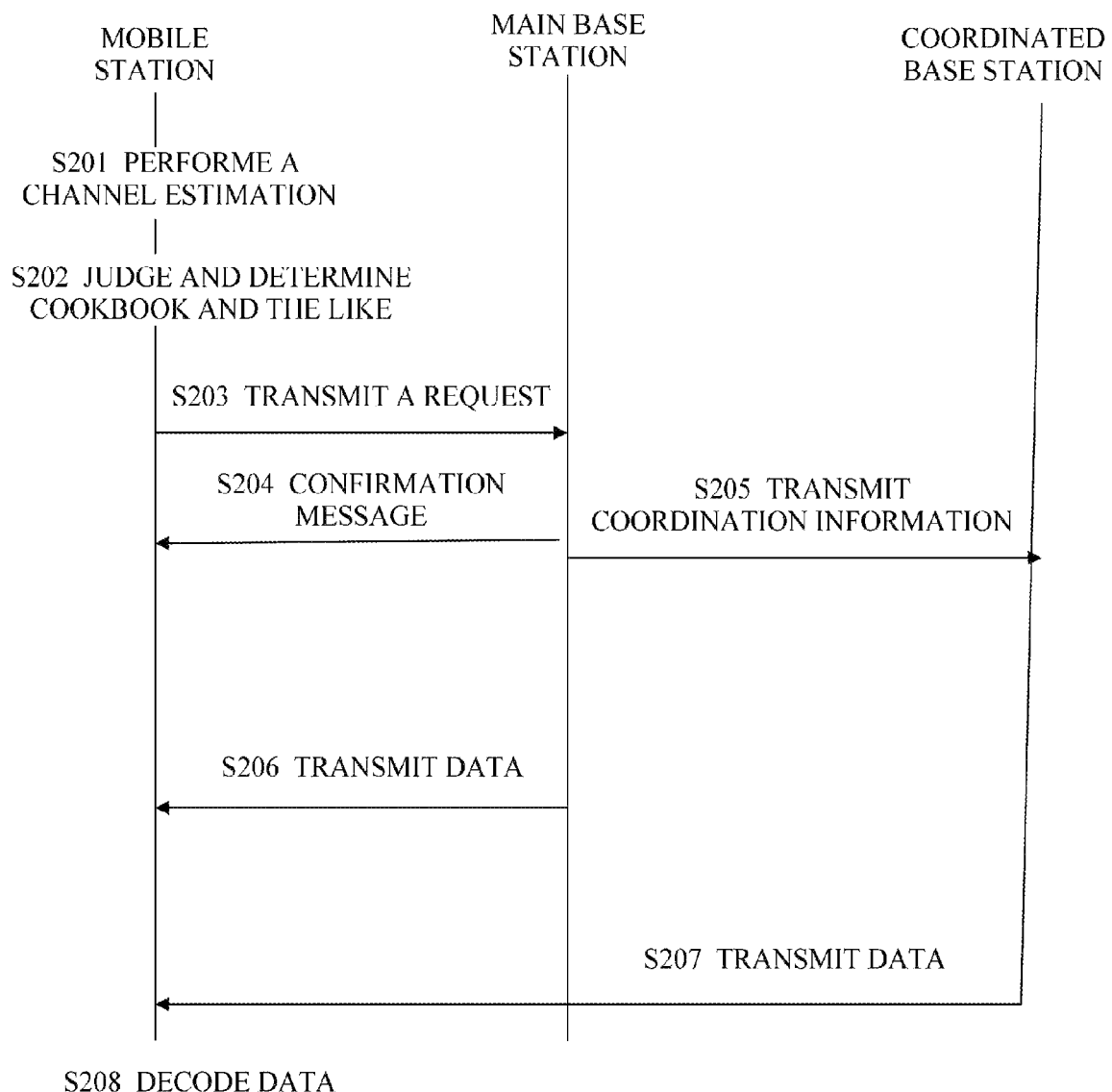
FIG. 11 illustrates a process flowchart of still another embodiment of a communication system composed of a mobile station, a main base station and a coordinated base station.

FIG. 11 illustrates a process flowchart of still another embodiment of a communication system composed of a mobile station, a main base station and a coordinated base station.

As illustrated in FIG. 11, in the communication system according to an embodiment of the present invention, firstly the mobile station carries out a channel estimation (S201) to estimate channel estimation values of a channel between the mobile station and the main base station and a channel between the mobile station and the coordinated base station. Next, the mobile station determines whether to perform a CoMP transmission, what type of CoMP transmission mode shall be adopted, and the codebooks (pre-coding matrixes) to be used by the main base station and the coordinated base station under the CoMP transmission mode, according to the channel estimation values (S202). Next, when it is determined to perform the CoMP transmission, a request that contains the above information and requires performing a CoMP transmission is transmitted to the main base station (S203). After receiving the request, the main base station determines whether or not to accept the request, and transmits a confirmation message to the mobile station (S204), while transmitting coordination information to the coordinated base station (S205), and then transmits data to the mobile station (S206). The coordinated base station determines the MCS and the codebook to be used according to the received coordination information, and then transmits coordination data (S207). After that, the mobile station decodes the data from the main base station and the coordinated base station (S208).

The main base station may reasonably dispatch the request according to the resource currently used by itself and the coordinated base station, for example: in case the pre-coding matrix corresponding to each base station indicated in the request is not used in each base station, the main base station may receive the request and determine corresponding CoMP transmission mode; in case the pre-coding matrix corresponding to each base station indicated in the request is being used by each or any base station, the main base station may reject the request.

To be noted, although the above steps are numbered sequentially, the sequences of these steps may be changed, and some steps may be performed concurrently.

Further, in the embodiment of the present invention, e.g., for the OFDM system, the transmitted data shall be pre-coded with a pre-selected codebook on each sub-carrier in the frequency domain of the OFDM system; in each sub-frame, respective sub-carriers are numbered through (k, l), wherein k is the serial number of the sub-carrier in each OFDM symbol, and l is the serial number of each OFDM symbol. The pre-coded signal is transmitted on M transmitting antennas and received by N receiving antennas. The received signal may be expressed as follows:

$$r(k,l) = \Gamma_0(k,l) \cdot U_0 \cdot s_0(k,l) + \Gamma_1(k,l) \cdot U_1 \cdot s_1(k,l) + \eta(k,l) \quad (0.1)$$

wherein $r(k,l)$, $\Gamma_i(k,l)$, $U_i$, $s_i(k,l)$ and $\eta_i(k,l)$ represent a received signal, a channel response matrix, a pre-coding vector, a transmitted signal and AWGN noise vector, respectively, and their vector dimensions are $N \times 1$, $N \times M$, $M \times 1$, $1 \times 1$ and $N \times 1$.

To be noted, the base station defined herein shall be explained in a most extensive range, including various apparatuses that form their own service areas and serve the communication apparatuses therein.

A person skilled in the art may appreciate that respective exemplary units and steps described in conjunction with the embodiments disclosed herein can be implemented by hardware, software or a combination thereof. Whether these functions are performed in the form of hardware or software depends on the specific application of the technical solution and the design constraint condition. Professionals may implement the described functions with different methods for each specific application, but such implementation shall not be regarded as going beyond the scope of the present invention.

The steps of methods or algorithms described in conjunction with the embodiments disclosed herein can be implemented with software executed by hardware (logic device such as computer). When the software is executed, the hardware (logic device such as computer) may be enabled to implement the above methods or their steps, or serve as components of the apparatus of the present invention.

The software may be put into a RAM, a memory, a ROM, an electrically programmable ROM, an electrically erasable programmable ROM, a register, a hard disk, a removable disk, a CD-ROM or a storage medium of any other form known in the art.

The above described embodiments are exemplary, instead of limitations to the present invention. According to the spirit of the present invention, a person skilled in the art may conceive of various modifications and changes, which also fall within the range of the present invention.

What is claimed is:

1. A communication apparatus, comprising:
   a channel estimating unit for acquiring a channel estimation value of a channel between the communication apparatus and a cell base station of a cell in which the communication apparatus is located, i.e., the channel estimation value between the communication apparatus and the cell base station;

a transmitting unit for transmitting the channel estimation value or information based on the channel estimation value to the cell base station;

a receiving unit for receiving coordinated multipoint (CoMP) message from the cell base station, the CoMP message indicates the CoMP transmission mode, the codebook or precoding matrix used by the cell base station, and the codebook or precoding matrix used by a coordinated base station that coordinates with the cell base station;

a channel matrix forming unit for acquiring a channel matrix according to the CoMP message; and a decoding unit for decoding received signals according to the channel matrix and the CoMP message, wherein the channel estimating unit further acquiring a channel estimation value of a channel between the communication apparatus and the coordinated base station, i.e., a channel estimation value between the communication apparatus and the coordinated base station; the communication apparatus further comprising a judging unit for determining whether or not to carry out a CoMP transmission; when the CoMP transmission is determined to be carried out, the transmitting unit transmits to the cell base station a request for CoMP transmission, as information based on the channel estimation value, wherein the judging unit further determining the CoMP transmission mode to be adopted, and the codebook or precoding matrix to be used by the cell base station and the coordinated base station; the request transmitted by the transmitting unit to the cell base station contains information that indicates the CoMP transmission mode and the codebook or precoding matrix, and wherein when the channel estimation value between the communication apparatus and the cell base station is between a first threshold value and a second threshold value, and the channel estimation value between the communication apparatus and the coordinated base station is between a third threshold value and a fourth threshold value, the judging unit determines that the CoMP transmission shall be carried out; when the channel estimation value between the communication apparatus and the cell base station is below a fifth threshold value located between the first threshold value and the second threshold value, the judging unit determines that the coherent CoMP transmission mode shall be adopted: when the channel estimation value between the communication apparatus and the cell base station is above the fifth threshold value, and the channel estimation value between the communication apparatus and the coordinated base station is above a sixth threshold value located between the third threshold value and the fourth threshold value, the judging unit determines that the first type coherent CoMP transmission mode shall be adopted: and when the channel estimation value between the communication apparatus and the cell base station is above the fifth threshold value, and the channel estimation value between the communication apparatus and the coordinated base station is below the sixth threshold value, the judging unit determines that the second type coherent CoMP transmission mode shall be adopted.

2. The communication apparatus according to claim 1, wherein the CoMP message indicates that the CoMP transmission mode is a coherent CoMP transmission mode, the channel matrix forming unit forms a channel matrix by performing a channel estimation on antennas of the cell base station and antennas of the coordinated base station, and the decoding unit decodes the received signals by regarding data from the cell base station and data from the coordinated base station as the same data.

3. The communication apparatus according to claim 1, wherein the CoMP message indicates that the CoMP transmission mode is a first type non-coherent CoMP transmission mode, the channel matrix forming unit forms a channel matrix by performing a channel estimation on antennas of the cell base station and antennas of the coordinated base station, and the decoding unit decodes the received signals by regarding data from the cell base station and data from the coordinated base station as different data.

4. The communication apparatus according to claim 1, wherein the CoMP message indicates that the CoMP transmission mode is a second type non-coherent CoMP transmission mode, the channel matrix forming unit forms a channel matrix by performing a channel estimation on antennas of the cell base station, and the decoding unit decodes the received signals with respect to data from the cell base station.

5. The communication apparatus according to claim 1, wherein when a second type non-coherent CoMP transmission mode is determined to be adopted, the judging unit determines the codebook or precoding matrix to be used by the cell base station in a rule maximizing the posterior signal to noise ratio (SNR) or throughput of the communication apparatus, and determines the codebook or precoding matrix to be used by the coordinated base station in a rule minimizing the posterior SNR or throughput of the communication apparatus.

6. A base station, comprising:

a receiving unit for receiving from a communication apparatus in a cell served by the base station, a channel estimation value of a channel between the communication apparatus and the base station;

a judging unit for determining, according to the channel estimation value, whether or not to carry out a coordinated multipoint (CoMP) transmission, the CoMP transmission mode to be adopted, the codebook or precoding matrix to be used by the base station, and the codebook or precoding matrix to be used by a coordinated base station that coordinates with the base station;

a first transmitting unit for informing the coordinated base station of coordination information, which contains information indicating the CoMP transmission mode and the codebook or precoding matrix to be used by the coordinated base, and data to be transmitted by the coordinated base station; and a second transmitting unit for transmitting, to the communication apparatus, information which indicates the CoMP transmission mode to be adopted, the codebook or precoding matrix to be used by the base station, and the codebook or precoding matrix to be used by a coordinated base station that coordinates with the base station, as well as data to be received by the communication apparatus, wherein the receiving unit further receives, from the communication apparatus, a channel estimation value of a channel between the communication apparatus and the coordinated base station, i.e., a channel estimation value between the communication apparatus and the coordinated base station; the judging unit determines according to the channel estimation value between communication apparatus and the coordinated base station and the channel estimation value between communication apparatus and the base station, and wherein when the channel estimation value between the communication apparatus and the base station is between a first threshold value and a second threshold value, and the channel estimation value between the communication apparatus and the coordinated base station is between a third threshold value and a fourth threshold value, the judging unit determines that the CoMP transmission shall be carried out; when the channel estimation value between the communication apparatus and the base station is below a fifth threshold value located between the first threshold value and the second threshold value, the judging unit determines that the coherent CoMP transmission mode shall be adopted; when the channel estimation value between the communication apparatus and the base station is above the fifth threshold value, and the channel estimation value between the communication apparatus and the coordinated base station is above a sixth threshold value located between the third threshold value and the fourth threshold value, the judging unit determines that the first type coherent CoMP transmission mode shall be adopted; and when the channel estimation value between the communication apparatus and the base station is above the fifth threshold value, and the channel estimation value between the communication apparatus and the coordinated base station is below the sixth threshold value, the judging unit determines that the second type coherent CoMP transmission mode shall be adopted.

7. A coordinated multipoint (CoMP) communication method used in communication apparatus, comprising:
   a channel estimation for acquiring a channel estimation value of a channel between the communication apparatus and a cell base station of a cell in which the communication apparatus is located;
   a transmitting for transmitting, to the cell base station, the channel estimation value or information based on the channel estimation value;
   a receiving for receiving a CoMP message from the cell base station, the CoMP message indicates the CoMP transmission mode, the codebook or precoding matrix used by the cell base station, and the codebook or precoding matrix used by a coordinated base station that coordinates with the cell base station;
   a channel matrix forming for acquiring a channel matrix according to the CoMP message; and
   a decoding for decoding received signals according to the channel matrix and the CoMP message, wherein the channel estimating further includes acquiring a channel estimation value of a channel between the communication apparatus and the coordinated base station, i.e., a channel estimation value between the communication apparatus and the coordinated base station; the communication method further comprising judging for determining whether or not to carry out a CoMP transmission; when the CoMP transmission is determined to be carried out, the transmitting transmits to the cell base station a request for CoMP transmission, as information based on the channel estimation value, wherein the judging further determining the CoMP transmission mode to be adopted, and the codebook or precoding matrix to be used by the cell base station and the coordinated base station; the request transmitted by the transmitting to the cell base station contains information that indicates the CoMP transmission mode and the codebook or precoding matrix, wherein when the channel estimation value between the communication apparatus and the cell base station is between a first threshold value and a second threshold value, and the channel estimation value between the communication apparatus and the coordinated base station is between a third threshold value and a fourth threshold value, the judging determines that the CoMP transmission shall be carried out; when the channel estimation value between the communication apparatus and the cell base station is below a fifth threshold value located between the first threshold value and the second threshold value, the judging determines that the coherent CoMP transmission mode shall be adopted; when the channel estimation value between the communication apparatus and the cell base station is above the fifth threshold value, and the channel estimation value between the communication apparatus and the coordinated base station is above a sixth threshold value located between the third threshold value and the fourth threshold value, the judging determines that the first type coherent CoMP transmission mode shall be adopted; and when the channel estimation value between the communication apparatus and the cell base station is above the fifth threshold value, and the channel estimation value between the communication apparatus and the coordinated base station is below the sixth threshold value, the judging determines that the second type coherent CoMP transmission mode shall be adopted.

* * * * *